United States Patent [19]

Godard et al.

[11] 4,353,410

[45] Oct. 12, 1982

[54] METHOD OF CONTROLLING THE HEATING OF A CHAMBER AND A CONTROLLED CHAMBER-HEATING INSTALLATION

[75] Inventors: Pierre Godard, Tremblay les Gonnesse; Michel Billot, Drancy, both of France

[73] Assignee: Saft-Societe des Accumulateurs Fixes et de Traction, Romainville, France

[21] Appl. No.: 91,099

[22] Filed: Nov. 5, 1979

[30] Foreign Application Priority Data

Nov. 16, 1978 [FR] France ................................ 78 32373

[51] Int. Cl.³ .................................................. F24J 3/02
[52] U.S. Cl. ...................................... 165/18; 126/422; 126/400; 126/432; 126/437
[58] Field of Search .................. 165/18; 126/400, 422, 126/432, 437; 236/11; 237/8 R

[56] References Cited

U.S. PATENT DOCUMENTS

| | | | |
|---|---|---|---|
| 3,931,806 | 1/1976 | Hayes | 165/18 X |
| 3,977,601 | 8/1976 | Bearzi | 237/1 A |
| 4,061,185 | 12/1977 | Faiczak | 165/18 X |
| 4,182,489 | 1/1980 | Lessieur | 126/422 |

FOREIGN PATENT DOCUMENTS

| | | | |
|---|---|---|---|
| 2308877 | 11/1976 | France | 122/422 |
| 2377011 | 4/1978 | France | 122/422 |
| 1537922 | 1/1979 | United Kingdom | 122/422 |

*Primary Examiner*—Albert J. Makay
*Assistant Examiner*—Henry Bennett
*Attorney, Agent, or Firm*—Kenyon & Kenyon

[57] ABSTRACT

The invention relates to a method of controlling the heating of a chamber and to a controlled installation for heating a chamber. Circulation of a heat-conveying fluid between a solar energy collector (CS) and a water heater chamber (10) is stopped when the temperature $t_A$ of a sensor placed at the outlet of the collector is lower than the temperature $t_B$ of a sensor placed at the inlet of the heat exchanger of the water heater, and also when the temperature $t_B$ is lower than or equal to the temperature $t_C$ of a sensor placed at the outlet of the heat exchanger. Application to producing domestic hot water.

12 Claims, 4 Drawing Figures

METHOD OF CONTROLLING THE HEATING OF A CHAMBER AND A CONTROLLED CHAMBER-HEATING INSTALLATION

The present invention relates to a method of controlling the heating of a chamber which contains a medium to be heated, e.g. water. It relates more particularly to the storage of solar energy by the medium contained in said chamber. For this purpose, a fluid called a heat-conveying fluid is used. By means of one heat exchanger, the fluid takes up heat from a source constituted by a solar energy collector and by means of another heat exchanger it transfers its heat to the medium in the chamber. The invention also relates to a controlled installation which applies the method to heating a storage chamber.

Storing solar energy (e.g. for heating water in a solar energy water heater, which then constitutes the previously mentioned chamber), requires a control system to provide transfer of heat between the solar collector and the water to be heated when the temperature of the solar collector is higher than that of the water and to stop such transfer in the contrary case. At present, a differential thermostat with two bulbs is used, one of which measures the temperature of the solar collector while the other measures the outlet temperature of the heat-conveying fluid after it passes through the water heater, e.g., at the bottom of the other heat exchanger disposed in the water heater, since it is preferable for the heat-conveying fluid to circulate in the other heat exchanger in a downwards direction so that it initially transfers its heat to the hottest water. When the temperature of the solar collector is higher than the outlet temperature of the water heater, circulation is started and it is stopped in the contrary case. This type of the thermostat has an operational inertia of several degrees centigrade. Further, it has a great disadvantage: in the case where even a small quantity of hot water is drawn off, cold water replaces it in the lower part of the water heater and circulation is started even if the average temperature of the water is higher than the temperature of the solar collector, because the temperature of the fluid at the outlet is lowered by the cold water in the bottom of the water heater. If the temperature of the solar collector lies between the average temperature of the chamber and the outlet temperature of the heat conveying fluid, this can cool the water at the top of the heat exchanger instead of heating it.

For this reason there has been a proposal for measuring the temperature at three points: a first point at the outlet from the solar collector, a second point near the top of the storage chamber near to the inlet of the heat-conveying fluid into the chamber, and a third point where the heat-conveying fluid leaves the chamber. The resulting measurements are used to control the circulation of the heat-conveying fluid as follows: circulation is stopped when the first temperature is less than or equal to the second temperature, and also when the first temperature is lower than the third temperature. This known system has the drawback of not taking into account the heat losses which inevitably occur between the solar collector and the storage chamber and which can result in the heat-conveying fluid being at a slightly lower temperature on entry into the storage chamber than the liquid stored therein even though it was at a slightly higher temperature on leaving the solar collector.

Preferred embodiments of the present invention mitigate these drawbacks.

The present invention provides a control method for controlling the heating of at least one heat storage chamber by means of a heat-conveying fluid, the method comprising:

providing a fluid circuit which includes a heat source, a heat storage chamber and controllable means for ensuring the circulation of a heat-conveying fluid from the heat source and through the heat storage chamber;

sensing the temperature $t_A$ of the heat-conveying fluid at its outlet from the heat source, the temperature $t_B$ of the heat-conveying fluid at its inlet to the heat storage chamber, and the temperature $t_C$ of the heat-conveying fluid at its outlet from the heat storage chamber; and controlling said controllable means to ensure that the heat-conveying fluid circulates from the heat source and through the heat storage chamber, except that circulation, at least through the heat storage chamber, is stopped when:

(1) the temperature $t_A$ is lower than the temperature $t_B$, or (2) the temperature $t_B$ is lower than or equal to the temperature $t_C$ even if the temperature $t_A$ is higher than the temperature $t_B$.

The fact that the temperature $t_B$ is less than the temperature $t_C$ indicates that the heat-conveying fluid is cooling down the storage chamber whereas it is intended to heat it up. The circulation must therefore be stopped. This situation can arise even when the temperature $t_A$ is higher than both $t_B$ and $t_C$, for example if there is heat loss from the heat-conveying fluid between the outlet from the solar collector and its inlet to the storage chamber. Further, since energy is consumed in circulating the fluid, it is a waste of energy to circulate the fluid even when $t_B$ and $t_C$ are merely equal.

In that case, since the fluid is at the same temperature as the chamber and no longer heats it, it may be advantageous to use the fluid to heat a second chamber which can be provided to reach a temperature different from that of the first chamber (for example a lower temperature) or a temperature equal to that of the first chamber. The use of a plurality of chambers at different temperatures has already been proposed.

The invention also provides an installation applying the method of the invention.

Two implementations of the method of the invention are described by way of example with reference to the accompanying drawing in which.

Figure 1:
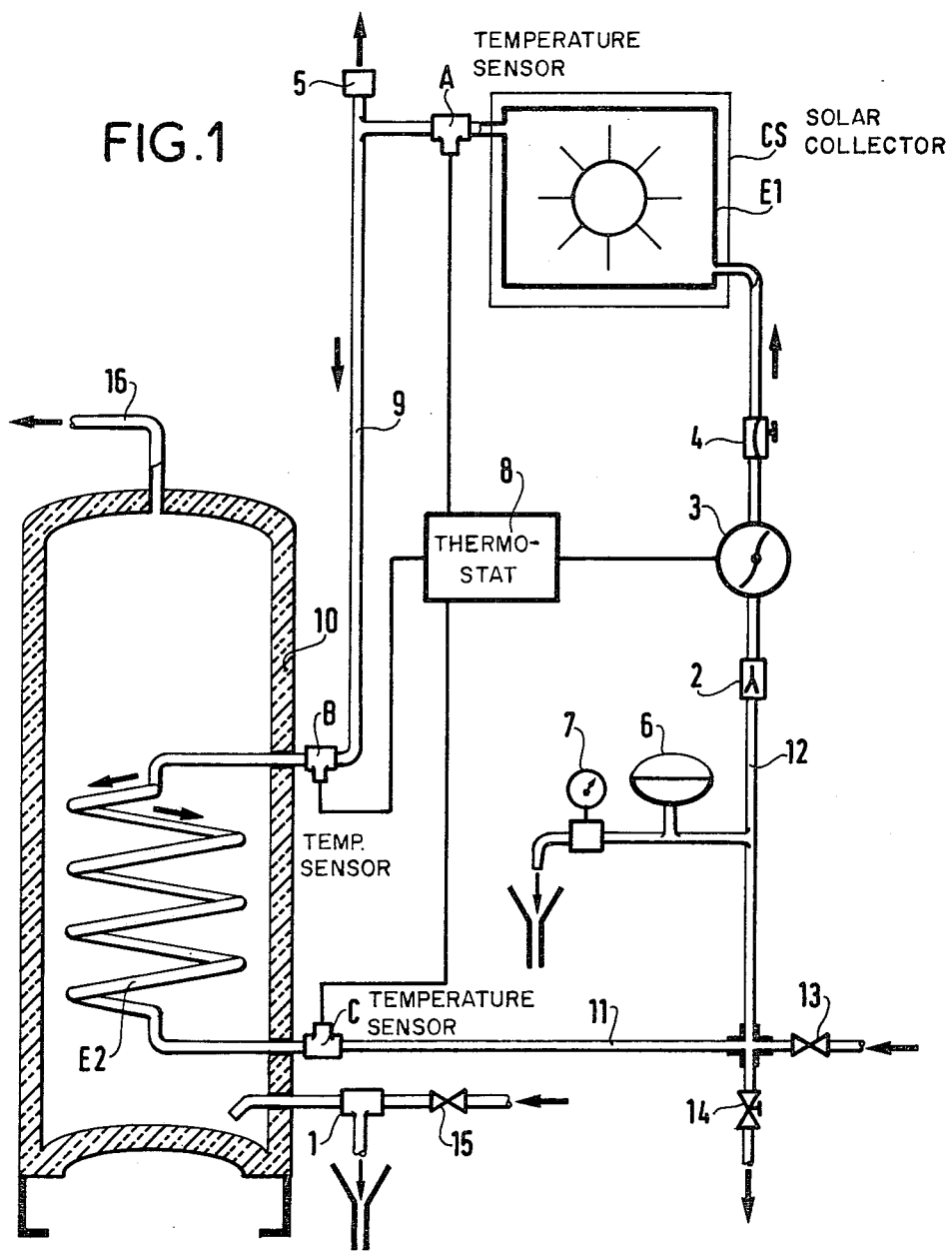
FIG. 1 illustrates schematically a first installation for implementing the method of the invention.

FIG. 1 illustrates a solar energy water heating system having a solar energy collector CS which contains a first heat exchanger E1 at whose output there is a temperature sensor A which senses a temperature $t_A$. The fluid which leaves the first heat exchanger flows along a pipe 9 till it reaches a second heat exchanger E2 which is placed inside a thermally insulated chamber 10. A temperature sensor B at the input of the heat exchanger E2 senses a temperature $t_B$ and a temperature sensor C at the output of the heat exchanger E2 senses a temperature $t_C$. The fluid is returned to the input of the heat exchanger E1 in the solar energy collector CS via pipes 11 and 12. A pump 3 pumps the fluid, and the fluid flow is regulated by a throttle 4, while a non-return valve 2 prevents the fluid from flowing in the wrong direction. The pump 3 is controlled by a differential thermostat 8 which receives the readings of three sensors A, B and C located, respectively, at the outlet of the first heat exchanger E1, at the inlet of the second heat exchanger E2, and at the outlet of heat exchanger E2. Naturally, the heat conveying circuit is provided with an automatic bleed valve 5, an expansion chamber 6 with a membrane and a safety valve 7 with a pressure gauge, as well as a filler valve 13 and a drain cock 14. In the example illustrated, the heat-conveying fluid is water to which anti-freeze and an anti-corrosion product are added.

Water to be heated arrives cold in the chamber 10 via a cock 15 and it leaves the chamber hot via a pipe 16. The sensor B is located at the point where the heat-conveying fluid enters the water heater whereby it measures the hottest water temperature. Operation can therefore proceed as follows:

Provided (1) temperature $t_A$ is higher than or equal to temperature $t_B$ and (2) temperature $t_B$ is higher than temperature $t_C$, the heat-conveying fluid may be circulated. In contrast, circulation should be stopped as soon as (1) $t_A$ is less than $t_B$ to prevent cooling the storage chamber, or (2) $t_B$ is less than or equal to $t_C$, since it is pointless to waste energy pumping the heat-conveying fluid when no heat can be transferred.

Thus when the temperature $t_A$ of the heat source represented by the solar collector CS is high (i.e. while the sun is heating it) and while the water in the water heater 10 is cold, $t_A$ will be higher than $t_B$ which will be higher than $t_C$. The pump 3 operates to circulate the heat conveying fluid, causing $t_B$ and $t_C$ to rise until if no hot water is drawn off, $t_B$ is equal to $t_C$. The pump stops, since no heat transfer is taking place any longer in the heat exchanger E2. If hot water is drawn off, cold water arrives in the water heater, $t_C$ drops below $t_B$, and the pump is restarted.

When the sun goes in, temperature $t_A$ drops and, on its dropping below $t_B$, the pump is stopped in order to prevent the heat conveying fluid from cooling down the water in the water heater even if $t_B$ remains higher than $t_C$. The circulation is restarted only when $t_A$ is higher than $t_B$ and $t_B$ is higher than $t_C$.

Figure 2:
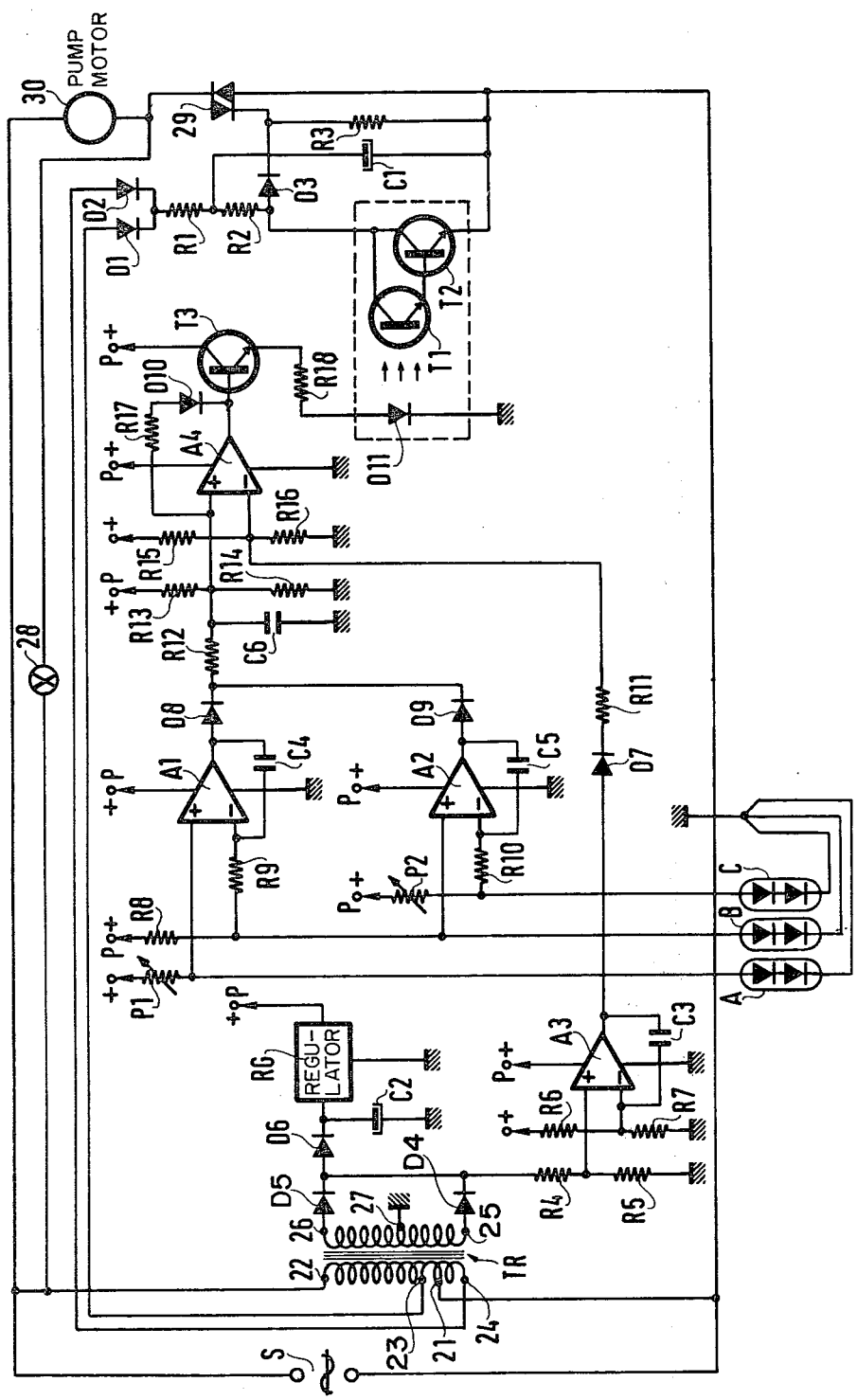
FIG. 2 is a diagram of an electric control circuit used to apply the method of the invention.

FIG. 2 is a circuit diagram of a thermostat 8 for controlling the above described mode of operation.

Mains S is applied to the primary winding of a transformer TR between taps 21 and 22 thereon. The ends 25 and 26 of the secondary winding are connected to the anodes of respective diodes D4 and D5 whose cathodes are connected together, while the centre tap 27 of the secondary winding is connected to earth to constitute a conventional full-wave rectifier. The cathodes of the diodes D4 and D5 are connected firstly to the anode of a diode D6 and secondly to earth via a potential divider constituted by two resistors R4 and R5 connected in series. The cathode of the diode D6 is connected to a regulator RG which supplies a constant positive potential to a point P which constitutes the positive supply terminal of the circuit. A capacitor C2 filters the rectified current supplied to the regulator which is itself also connected to earth.

The point common to the resistors R4 and R5 is connected to the first input of an amplifier A3 whose second input is connected to the point common to two resistors R7 and R6 connected in series between earth and point P. The amplifier A3 is supplied between point P and earth, and a capacitor C3 is connected between its second input and its output.

A, B and C are the three temperature sensors illustrated in FIG. 1. In the example shown, they are constituted by three series of silicon diodes. These three temperature sensors are connected between earth on one side and point P on the other via a potentiometer P1 for A, via a resistor R8 for B, and via a potentiometer P2 for C.

The potentiometers P1 and P2 balance the power supply to the sensors so that temperature differences can be measured accurately.

The point common to the potentiometer P1 and to the sensor A is connected to a first, positive, input of an amplifier A1. The point common to the resistor R8 and to the sensor B is connected via a resistor R9 to the second, negative, input of the amplifier A1. A capacitor C4 connected between the second input and the output and power supply connections to earth and point P complete the circuits of the amplifier A1.

The point common to the resistor R8 and to the sensor B is also connected to a first, positive, input of an amplifier A2. The point common to the potentiometer P2 and to the sensor C is connected via a resistor R10 to the second input of the amplifier A2. A capacitor C5 connected between the second input and the output and power supply connections to earth and point P complete the circuits of the amplifier A2.

The outputs of the amplifiers A1 and A2 are connected via diodes D8 and D9 respectively to one terminal of a resistor R12. The other terminal of the resistor R12 is connected to a first input of an amplifier A4. The point common to the resistor R12 and to the first input of the amplifier A4 is connected to the point common to two resistors R13 and R14 which are in series between point P and earth. It is also connected to earth via a capacitor C6. A second input of the amplifier A4 is connected via a diode D7 and a resistor R11 to the output of the amplifier A3. It is also connected to the point common to two resistors R15 and R16 which are in series between point P and earth. A circuit formed by a resistor R17 and a diode D10 is connected between the first input of the amplifier A4 and the output thereof. Further, the amplifier A4 draws its power between point P and earth. Its output is connected to the base of an NPN transistor T3 whose collector is connected to point P and whose emitter is connected via a resistor R18 to the anode of a light-emitting diode (LED) D11 which forms a part of an optical coupler which also includes Darlington connected NPN phototransistors T1 and T2. The emitter of the transistor T2 is connected to a first main electrode of a Triac 29, and its collector is connected to the anode of a diode D3 whose cathode is connected to the trigger of the Triac 29. A resistor R3 is connected between the trigger and the first electrode of the Triac 29.

An alternating potential is taken from two taps 23 and 24 on the primary winding of the transformer TR situated on either side of the tap 21. This potential is rectified by the diodes D1 and D2 which correspond respectively to taps 23 and 24. The cathodes of the diodes D1 and D2 are connected together and, via two resistors R1 and R2 in series, to the anode of the non-return diode D3. This constitutes the power supply circuit for the trigger of the Triac 29. A capacitor C1 is connected between the point common to the resistors R1 and R2 and the point common to the emitter of the transistor T2 and the first electrode of the Triac 29. The first electrode of the Triac 29 is also connected to the mains S and its second electrode is connected to a terminal of the motor 30 of the pump 3 (FIG. 1). The other terminal of the motor is connected to the mains S, and a neon lamp 28 which glows when the motor operates is connected between the terminals of the motor 30.

The installation operates as follows:

The amplifier A1 compares the potentials at the terminals of the sensors A and B, and the amplifier A2 compares the potentials at the terminals of the sensors B and C.

The amplifier A3 generates a pulse waveform at twice the frequency of the AC mains.

The amplifier A4 combines the data which comes from the amplifiers A1 and A2 and is modulated by the amplifier A3. It feeds the optical coupler D11-T1-T2 to turn the Triac 29 on or off, with turn on synchronized with the AC zero crossings, to avoid radio interference, whenever the amplifiers A1 and A2 enable the motor 30 to start operating.

The amplifier A4 has a feed back circuit R17-D10 which ensures that it switches completely when its output is negative, the Triac being switched on, thereby avoiding switching the Triac 29 on and off at each half cycle once it has been switched on.

If one (or both) of the amplifiers A1 or A2 ceases to enable motor operation, the amplifier 4 switches, its output becoming positive, and lights the LED D11 of the optical coupler. The corresponding phototransistor T1-T2 becomes conductive and shunts the supply current from the trigger of the Triac 29, which turns off when the current which it conducts passes through zero.

The power supply of the temperature sensors A, B and C is isolated from the mains both by the transformer TR and by the optical coupler D11-T1-T2. The point common to the sensors is earthed. All three sensors are supplied via pairs of wires of the same length and cross-section so as to retain as high an accuracy as possible in the differential values for turning the motor on and off.

Figure 3:
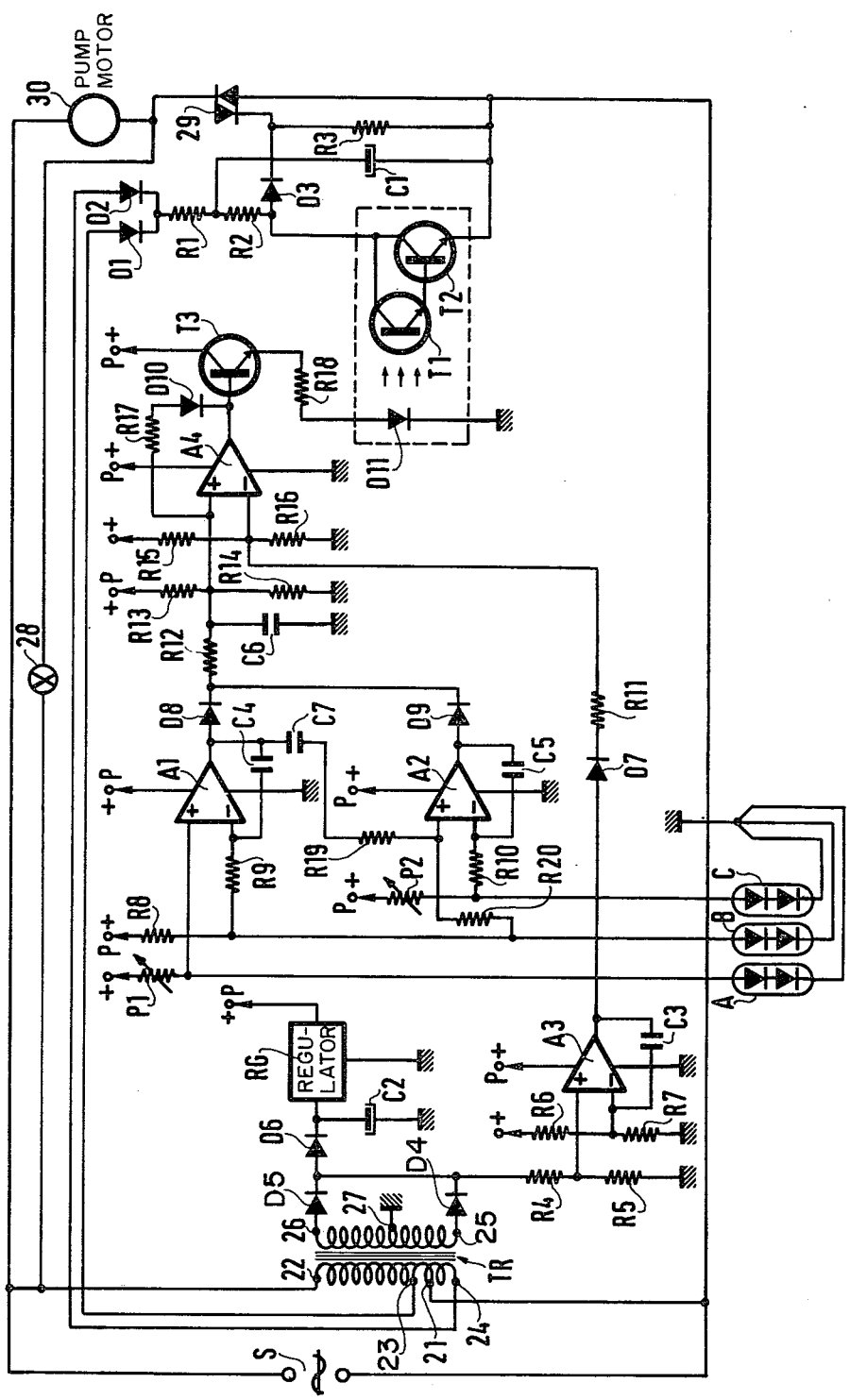
FIG. 3 shows a variant of the circuit illustrated in FIG. 2.

The control unit which has just been described operates properly once circulation is established and so long as there remain differences in temperature between the various points of the fluid circuit. However, it has the disadvantage of inhibiting starting of the circulation of the heat conveying fluid when the temperatures $t_B$ and $t_C$ are equal. This disadvantage can be overcome by an additional circuit, not illustrated, for manually overriding the inhibition of the circulation, provided the fluid has not been circulating and has therefore not been able to give rise to the temperature differences necessary to maintain circulation. However, it is often preferable to provide a first variant of the control unit, in accordance with FIG. 3, in which a circulation enable condition due to $t_A$ being greater than $t_B$ is given priority over a circulation inhibit condition due to $t_C$ being equal to $t_B$. With this aim in view, the output signal of the amplifier A1 is applied to the positive input of the amplifier A2 via a capacitor C7 which is in series with a resistor R19, the signal of the sensor B being applied to said input via a resistor R20. Therefore, if the temperature $t_A$ rises higher than the temperature $t_B$, while the latter is equal to the temperature $t_C$ or even to a slightly lower temperature (a maximum of 2° C.), when the amplifier A1 switches, it causes the amplifier A2 to switch for a few seconds. This temporarily allows the heat conveying fluid to circulate for a period which is sufficient to raise the temperature of the sensor B above that of the sensor C under the effect of the circulating heat conveying fluid. The fluid is thereby firmly put into a circulation enable condition. This period is defined by the time constant of the circuit R19-C7.

The Triac system described hereinabove has the advantage of being able to operate several times per minute and it uses a maximum of solar energy available at the output of the solar collector. Therefore, it can also be used advantageously in a two temperature heat storage system for solar heating of a home directly (hot air) and indirectly (using air/water heat exchange).

Such a system will now be described with reference to FIG. 4. In this system, the heat conveying fluid is now air which is taken from under a partially transparent house roof that provides a greenhouse effect. This air is taken directly from the roof space for medium temperature heat storage (generally about 30° C.) and via a solar collector for high temperature heat storage (generally about 70° C.). The heat stored at high temperature can be used directly during sunless periods and that stored at medium temperature can be used to raise the temperature of the cold source of a heat pump whose hot source is sufficient for the heating requirements of the house.

Figure 4:
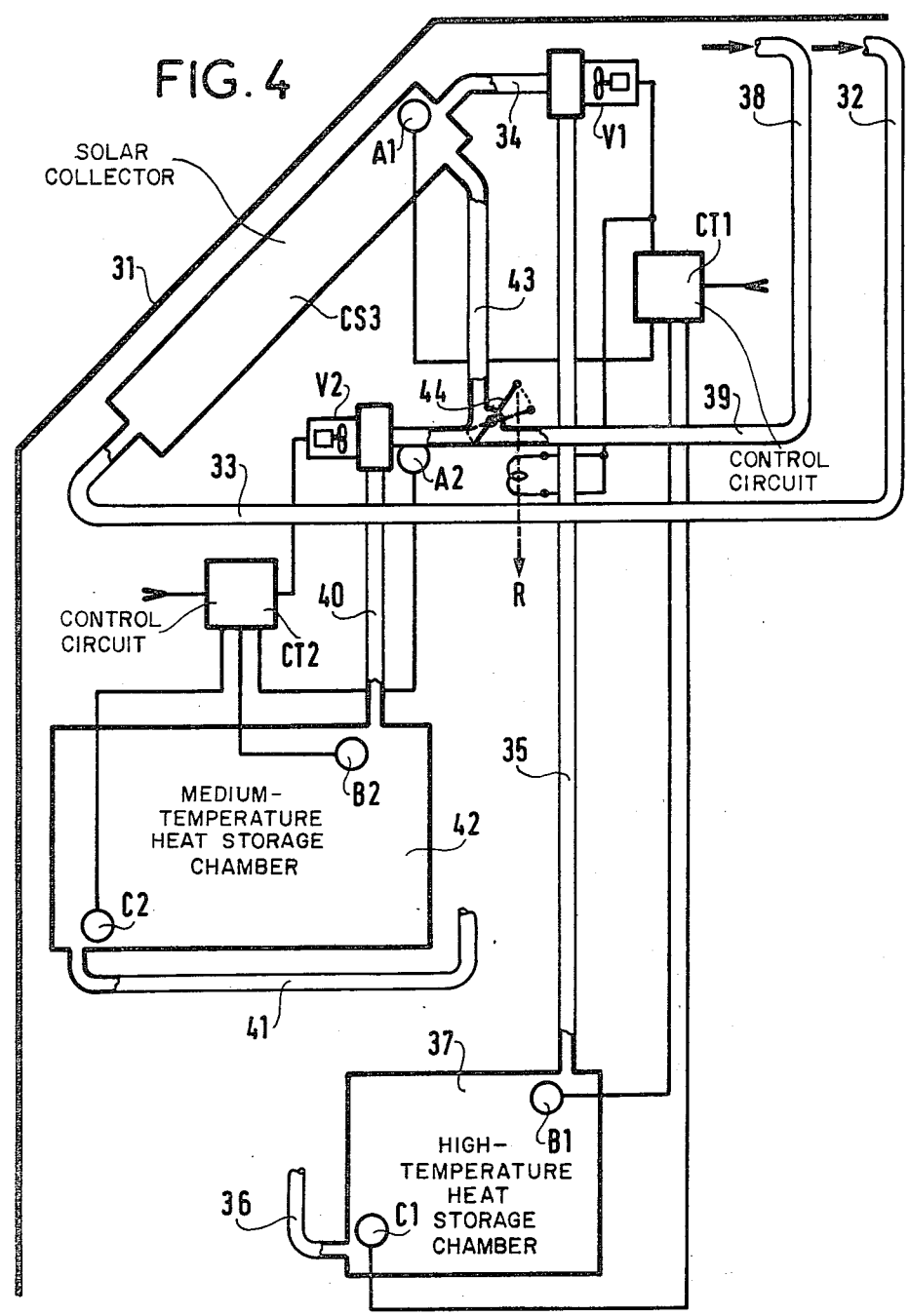
FIG. 4 shows schematically a second installation for implementing the method of the invention.

The diagram of FIG. 4 shows, in outline, an installation which uses two fluid circuits controlled in accordance with the invention.

The transparent portion of the roof of a house is shown very schematically at 31. A solar collector CS3 is disposed under the portion 31 and via a pipe 33, it receives somewhat heated air taken from under the top of the roof through the end 32 of a pipe disposed there for that purpose. The air is heated in the collector, leaves via a pipe 34, is propelled by a fan V1 and is conveyed through a pipe 35 to a high-temperature heat storage chamber 37 where it is cooled and which it leaves through a pipe 36. A temperature sensor A1 is disposed in the air circuit at the outlet of the collector CS3; a sensor B1 is disposed at the inlet of the chamber 37; and a sensor C1 is disposed at the outlet of the chamber 37 which may be, for example, a water heater analogous to the water heater 10 of FIG. 1. A control circuit CT1 analogous to that of FIG. 2 receives the temperature readings $t_{A1}$, $t_{B1}$ and $t_{C1}$ from the sensors A1, B1 and C1 and controls the operation of the fan V1 as a function of these readings in the same way as the circuit 8 of FIG. 1 controls the operation of the pump 3 as a function of the readings of the sensors A, B and C.

A second fan V2 draws air taken from 38 directly from under the roof along a pipe 39 and conveys it via a pipe 40 into a medium-temperature heat storage chamber 42 which it leaves via a pipe 41. A temperature sensor A2 is disposed just before the fan V2; a sensor B2 is disposed at the inlet of the chamber 42; and a sensor C2 is disposed at the outlet of the chamber 42. The temperature readings $t_{A2}$, $t_{B2}$ and $t_{C2}$ of the sensors A2, B2 and C2 are conveyed to a circuit CT2 analogous to the circuit of FIG. 2, which controls the operation of the fan V2 as a function of these readings in the same way as the circuit 8 of FIG. 1 controlled the operation of the pump 3 as a function of the readings of the sensors A, B and C.

A pipe 43 is situated between the outlet of the collector CS3 and an inlet of the pipe 39. A valve 44 can close the inlet of the pipe 43 leading into the pipe 39 or, on the contrary, it can close the part of the pipe 39 upstream of the inlet of the pipe 43. It is controlled by a solenoid R, which is energized by the circuit CT1 at the same time as the motor of the fan V1, to move the valve 44 into the closed position of the pipe 43.

The installation operates as follows:

When the sun shines brightly, both storage chambers are heated simultaneously. The medium temperature heat storage chamber 42 receives the hot air taken from the top of the partially transparent roof space and the high-temperature heat storage chamber 37 receives the air superheated in the collector CS3 under the roof, each chamber being controlled by its control circuit. If the sunlight decreases or if the high-temperature storage is completely heated, the circuit CT1 stops the fan V1 and makes the valve 44 change position so that the medium-temperature storage receives hot air from the collector CS3 via the pipe 43. The sensor A1 is protected from the draught caused by the fan V2 to allow the fan V1 to be operated again eventually even if the fan V2 has been drawing from the collector CS3, e.g. during the early hours of the morning. Therefore, when the temperature $t_{A1}$ is lower than the temperature $t_{B1}$ of the first chamber (37) and when the temperature $t_{B1}$ is lower than or equal to the temperature $t_{C1}$, the heat-conveying fluid which comes from the first heat source (CS3) is conveyed to the second chamber (42).

Of course, the applications and the circuits which have just been described have been given only by way of example, and the means described can be replaced by equivalent means. It is obvious that the heat-conveying fluid can be a non-aqueous fluid or a gas other than air and that the medium stored in the chambers can be a liquid or even a solid.

It is also possible to combine the readings of more than two control circuits to affect a corresponding number of heat-conveying fluid circuits. Further, the fluid circuits need not be parallel and independent as described in the preceding example, but may affect one another, the heat source of one corresponding to the storage chamber of the other so that the temperature $t_A$ of one circuit is the same as the temperature $t_B$ of the other.

We claim:

1. A method for controlling the heating of at least one heat storage chamber by means of a heat-conveying fluid, the method comprising:
   providing a fluid circuit which includes a heat source, a heat storage chamber and controllable means for ensuring the circulation of a heat-conveying fluid from the heat source and through the heat storage chamber;
   sensing the temperature $t_A$ of the heat-conveying fluid at its outlet from the heat source, the temperature $t_B$ of the heat-conveying fluid at its inlet to the heat storage chamber, and the temperature $t_C$ of the heat-conveying fluid at its outlet from the heat storage chamber; and
   controlling said controllable means to ensure that the heat-conveying fluid circulates from the heat source and through the heat storage chamber whenever $t_A$ exceeds $t_B$ and $t_B$ exceeds $t_C$, and to stop circulation of said heat-conveying fluid, at least through the heat storage chamber, if the temperature $t_A$ becomes lower than the temperature $t_B$, or the temperature $t_B$ becomes lower than or equal to the temperature $t_C$.

2. A method according to claim 1, for controlling the heat of two storage chambers, the method comprising:
   providing an additional storage chamber for lower temperature heat storage than the first-mentioned storage chamber; and
   directing heat-conveying fluid from the heat source to the additional heat storage chamber when circulation through the first-mentioned heat storage chamber is stopped.

3. A method for controlling the heating of two heat storage chambers by means of a heat-conveying fluid, the method comprising:
   providing a fluid circuit which includes a heat source, a first heat storage chamber and controllable means for ensuring the circulation of a heat-conveying fluid from the heat source and through the heat storage chamber;
   sensing the temperature $t_A$ of the heat-conveying fluid at its outlet from the heat source, the temperature $t_B$ of the heat-conveying fluid at its inlet to the heat storage chamber, and the temperature $t_C$ of the heat-conveying fluid at its outlet from the heat storage chamber;
   controlling said controllable means to ensure that the heat-conveying fluid circulates from the heat source and through the heat storage chamber whenever $t_A$ exceeds $t_B$ and $t_B$ exceeds $t_C$, and to stop circulation of said heat-conveying fluid, at least through the heat storage chamber, if the temperature $t_A$ becomes lower than the temperature $t_B$, or the temperature $t_B$ becomes lower than or equal to the temperature $t_C$;
   providing a second storage chamber for lower temperature heat storage than the first-mentioned storage chamber, wherein the second heat storage chamber forms part of an additional fluid circuit including an additional heat source and additional means for ensuring the circulation of the heat-conveying fluid from the additional heat source and through the second heat storage chamber;
   directing heat-conveying fluid from the heat source to the second heat storage chamber when circulation through the first heat storage chamber is stopped; and
   controlling said additional fluid circuit to operate independently of the first-mentioned fluid circuit except when circulation through the first heat storage chamber is stopped.

4. A method according to claim 1, the method further comprising resuming circulation of the fluid in the first mentioned circuit as soon as the temperature $t_A$ is higher than the temperature $t_B$, if the temperature $t_B$ is not lower than the temperature $t_C$ by more than a predetermined value, and restopping circulation through the first mentioned heat storage chamber if $t_B$ does not rise above $t_C$ within a predetermined time period.

5. A controllable heating installation for heating at least one heat storage chamber, said installation including:
   a fluid circuit including:
     a heat source;
     an upstream heat exchanger in thermal contact with said source;
     a heat storage chamber;
     a downstream heat exchanger in thermal contact with the heat storage chamber; and controllable means for ensuring the circulation of a heat-conveying fluid from the upstream heat exchanger and then through the downstream heat exchanger;

an upstream temperature sensor disposed for sensing a temperature $t_A$ at the heat-conveying fluid outlet from the upstream heat exchanger;

an intermediate temperature sensor disposed for sensing a temperature $t_B$ at the heat-conveying fluid inlet to the downstream heat exchanger;

a downstream temperature sensor disposed for sensing a temperature $t_C$ at the heat-conveying fluid from the downstream heat exchanger; and a control unit which controls said controllable means, wherein the improvement comprises the control unit including a first stop condition detector to cause the controllable means to stop the fluid from circulating at least in said storage chamber when the temperature $t_A$ is lower than the temperature $t_B$, and a second stop condition detector to cause the controllable means to stop the fluid from circulating in said storage chamber when the temperature $t_B$ is lower than or equal to the temperature $t_C$, even if the temperature $t_A$ is higher than the temperature $t_B$.

6. An installation according to claim 5, and further comprising an additional heat storage chamber for lower temperature heat storage than the first-mentioned heat storage chamber and means for selecting one or other of the heat storage chambers as a destination for the heat-conveying fluid from the upstream heat exchanger, and the control unit including means for actuating the selecting means to direct the heat-conveying fluid from the upstream heat exchanger through the additional heat storage chamber when circulation of the heat-conveying fluid through the downstream heat exchanger is stopped.

7. A controllable heating installation for heating at least one heat storage chamber, said installation including:

a fluid circuit including:
a heat source;
an upstream heat exchanger in thermal contact with said source;
a heat storage chamber;
a downstream heat exchanger in thermal contact with the heat storage chamber; and
controllable means for ensuring the circulation of a heat-conveying fluid from the upstream heat exchanger and then through the downstream heat exchanger;

an upstream temperature sensor disposed for sensing a temperature $t_A$ at the heat-conveying fluid outlet from the upstream heat exchanger;

an intermediate temperature sensor disposed for sensing a temperature $t_B$ at the heat-conveying fluid inlet to the downstream heat exchanger;

a downstream temperature sensor disposed for sensing a temperature $t_C$ at the heat-conveying fluid from the downstream heat exchanger; and a control unit which controls said controllable means, wherein the improvement comprises:

an additional heat storage chamber for lower temperature heat storage than the first-mentioned heat storage chamber, wherein the additional heat storage chamber forms part of an additional fluid circuit including an additional heat source and additional means for ensuring the circulation of the heat-conveying fluid from the additional heat source and through the additional heat storage chamber, said additional fluid circuit being arranged to operate independently of the first-mentioned fluid circuit except when circulation through the downstream heat exchanger is stopped;

means for selecting one or other of the heat storage chambers as a destination for the heat-conveying fluid from the upstream heat exchanger; and the control unit including a first stop condition detector to cause the controllable means to stop the fluid from circulating at least in said first-mentioned storage chamber when the temperature $t_A$ is lower than the temperature $t_B$, a second stop condition detector to cause the controllable means to stop the fluid from circulating in said first-mentioned storage chamber when the temperature $t_B$ is lower than or equal to the temperature $t_C$, even if the temperature $t_A$ is higher than the temperature $t_B$, and means for actuating the selecting means to direct the heat-conveying fluid from the upstream heat exchanger through the additional heat storage chamber when circulation of the heat-conveying fluid through the downstream heat exchanger is stopped.

8. An installation according to claim 7, and including means for initiating fluid circulation in the downstream heat exchanger when the temperature $t_A$ is higher than the temperature $t_B$, and inhibition means for temporarily preventing the action of said second stop condition detector for a predetermined time period after said initiation.

9. A method for controlling the heating of two heat storage chambers by means of a heat-conveying fluid, the method comprising:

providing a fluid circuit which includes a heat source, a first heat storage chamber, controllable means for ensuring the circulation of a heat-conveying fluid from the heat source and through the first heat storage chamber, and a second heat storage chamber for lower temperature heat storage than the first storage chamber;

sensing the temperature $t_A$ of the heat-conveying fluid at its outlet from the heat source, the temperature $t_B$ of the heat-conveying fluid at its inlet to the heat storage chamber, and the temperature $t_C$ of the heat-conveying fluid at its outlet from the heat storage chamber; and controlling said controllable means to ensure that the heat-conveying fluid circulates from the heat source and through the first heat storage chamber whenever $t_A$ exceeds $t_B$ and $t_B$ exceeds $t_C$, and to stop circulation of said heat-conveying fluid, at least through the heat storage chamber, if the temperature $t_A$ becomes lower than the temperature $t_B$, or the temperature $t_B$ becomes lower than or equal to the temperature $t_C$;

directing heat-conveying fluid from the heat source to the second heat storage chamber when circulation through the first heat storage chamber is stopped; and resuming circulation of the fluid in the first mentioned circuit as soon as the temperature $t_A$ is higher than the temperature $t_B$, if the temperature $t_B$ is not lower than the temperature $t_C$ by more than a predetermined value, and restopping circulation through the first heat storage chamber if $t_B$ does not rise above $t_C$ within a predetermined time period.

10. A method for controlling the heating of two heat storage chambers by means of a heat-conveying fluid, the method comprising:

providing a fluid circuit which includes a heat source, a first heat storage chamber, and controllable means for ensuring the circulation of a heat-conveying fluid from the heat source and through the first heat storage chamber, and a second heat storage chamber for lower temperature heat storage than the first storage chamber, the second heat storage chamber forming part of an additional fluid circuit including an additional heat source and additional means for ensuring the circulation of the heat-conveying fluid from the additional heat source and through the additional heat storage chamber;

sensing the temperature $t_A$ of the heat-conveying fluid at its outlet from the heat source, the temperature $t_B$ of the heat-conveying fluid at its inlet to the heat storage chamber, and the temperature $t_C$ of the heat-conveying fluid at its outlet from the heat storage chamber; and controlling said controllable means to ensure that the heat-conveying fluid circulates from the heat source and through the first heat storage chamber whenever $t_A$ exceeds $t_B$ and $t_B$ exceeds $t_C$, and to stop circulation of said heat-conveying fluid, at lest through the heat storage chamber, if the temperature $t_A$ becomes lower than the temperature $t_B$, or the temperature $t_B$ becomes lower than or equal to the temperature $t_C$;

directing heat-conveying fluid from the heat source to the second heat storage chamber when circulation through the first heat storage chamber is stopped; and resuming circulation of the fluid in the first mentioned circuit as soon as the temperature $t_A$ is higher than the temperature $t_B$, if the temperature $t_B$ is not lower than the temperature $t_C$ by more than a predetermined value, and restopping circulation through the first heat storage chamber if $t_B$ does not rise above $t_C$ within a predetermined time period.

11. A controllable heating installation for heating at least one heat storage chamber, said installation including:

a fluid circuit including;
a heat source;
an upstream heat exchanger in thermal contact with said source;
a heat storage chamber;
a downstream heat exchanger in thermal contact with the heat storage chamber; and
controllable means for ensuring the circulation of a heat-conveying fluid from the upstream heat exchanger and then through the downstream heat exchanger;
an upstream temperature sensor disposed for sensing a temperature $t_A$ at the heat-conveying fluid outlet from the upstream heat exchanger;
an intermediate temperature sensor disposed for sensing a temperature $t_B$ at the heat-conveying fluid inlet to the downstream heat exchanger;
a downstream temperature sensor disposed for sensing a temperature $t_C$ at the heat-conveying fluid from the downstream heat exchanger; and
a control unit which controls said controllable means, wherein the improvement comprises:
the control unit including a first stop condition detector to cause the controllable means to stop the fluid from circulating at least in said storage chamber when the temperature $t_A$ is lower than the temperature $t_B$, and a second stop condition detector to cause the controllable means to stop the fluid from circulating in said storage chamber when the temperature $t_B$ is lower than or equal to the temperature $t_C$, even if the temperature $t_A$ is higher than the temperature $t_B$; and
the installation further including means for initiating fluid circulation in the downstream heat exchanger when the temperature $t_A$ is higher than the temperature $t_B$, and inhibition means for temporarily preventing the action of said second stop condition detector for a predetermined time period after said initiation.

12. An installation according to claim 11, and further comprising an additional heat storage chamber for lower temperature heat storage than the first-mentioned heat storage chamber and means for selecting one or other of the heat storage chambers as a destination for the heat-conveying fluid from the upstream heat exchanger, and the control unit including means for actuating the selecting means to direct the heat-conveying fluid from the upstream heat exchanger through the additional heat storage chamber when circulation of the heat-conveying fluid through the downstream heat exchanger is stopped.

* * * * *